United States Patent [19]

Murch et al.

[11] 4,322,946

[45] Apr. 6, 1982

[54] THERMAL THRUSTER WITH SUPERHEATER

[75] Inventors: Charles K. Murch, Rancho Palos Verdes; Charles R. Hunter, Lomita, both of Calif.

[73] Assignee: TRW Inc., Redondo Beach, Calif.

[21] Appl. No.: 655,361

[22] Filed: Feb. 5, 1976

Related U.S. Application Data

[63] Continuation of Ser. No. 543,195, Jan. 22, 1975, abandoned.

[51] Int. Cl.³ ............................................. F02K 9/00
[52] U.S. Cl. .............................. 60/203.1; 60/39.46 M
[58] Field of Search ............. 60/200 R, 203, 39.46 M, 60/218

[56] References Cited

U.S. PATENT DOCUMENTS

| | | | |
|---|---|---|---|
| 3,583,161 | 6/1971 | Simms | 60/203 |
| 3,807,657 | 4/1974 | Brill | 60/203 |
| 3,871,828 | 3/1975 | Ellion et al. | 60/39.46 M |
| 3,956,885 | 5/1976 | Davis et al. | 60/203 |

Primary Examiner—Robert E. Garrett
Attorney, Agent, or Firm—Donald R. Nyhagen; John J. Connors

[57] ABSTRACT

An electrothermal thruster operating at high temperature is employed for satellite control.

7 Claims, 4 Drawing Figures

THERMAL THRUSTER WITH SUPERHEATER

This is a continuation of application Ser. No. 543,195 filed Jan. 22, 1975 now abandoned.

BACKGROUND OF THE INVENTION

This invention relates to a new and improved thruster and, more specifically, to an electrothermal thruster adapted for maneuvering spacecraft.

Electrically heated hydrazine thrusters are well known, and are discussed in:

AIAA 8th Electrical Propulsion Conference 1970 #70-1161;

AIAA/SAE 8th Joint Propulsion Specialist Conference 1972 #72-1152;

AIAA 9th Electricl Propulsion Conference 1972 #72-451; U.S. Pat. No. 3,081,595;

"Study of Monopropellants for Electrothermal Hydrazine Thrusters" March 1973–May 1974, by J. D. Kuenzly, Final Report for Goddard Space Flight Center, Contract NAS 5-23202; and International Conference—Properties of Hydrazine and its Potential Applications as an Energy Source (Poitiers, France, Oct. 21-25, 1974)-"Electrothermal Hydrazine Thruster Development for Low Thrust Applications."

These thrusters have particular capability to provide one or more of the following functions: attitude control, initial orbit correction, initial stationkeeping, repositioning, drag make-up, orbit raising and evasive maneuvers.

As an example, a commercial communications satellite would require all of the above functions (except the last three) to be performed by the on-board propulsion system. For such a spacecraft with an orbital weight of 2000 pounds, an on-board catalytic hydrazine system would weigh about 500 pounds for a seven-year mission. The total payload weight would be about 400 pounds with the remainder of the weight allocated to the power system, structures, command and telemetry and so forth.

In addition to satellites for commercial communications, spacecraft for military, or scientific purposes are typical of long life earth orbital spacecraft which require thie maneuvering capability.

Obviously, any reduction in propulsion system weight which could be used to increase the payload capability would be highly desirable. Increasing the payload would permit a greater return on the spacecraft program investment through such means as greater communications capacity, the accumulation of more scientific data, the provision of additional surveillance equipment, fewer launches per series, or the capability to use smaller, less expensive launch vehicles.

Initially, in the United States space program, virtually all spacecraft which required on-board propulsion relief on cold gas systems which produced a specific impulse of about 70 seconds. However, when spacecraft missions became longer and more complex, the demands placed on spacecraft propulsion systems become more stringent. As the propulsion requirements increased, cold gas was supplanted by catalytically-decomposed hydrogen peroxide which offered significant propulsion system weight savings at the cost of increased complexity and various operational difficulties. The use of hydrogen peroxide propulsion systems was discontinued in favor of catalytically-decomposed anhydrous hydrazine which offered still greater weight savings and eliminated some of the hydrogen peroxide operation problems. Catalytic hydrazine thrusters typically deliver a specific impulse of 215-235 seconds (steady state) and systems employing such thrusters are now widely used for a variety of spacecraft missions.

Specific impulse is a figure-of-merit commonly used for thruster performance and is defined as the thrust that can be obtained with a propellant weight flow rate of unity. Specific impulse is determined by the energy content of the gases in the thrust chamber and the efficiency of the nozzle expansion process which converts this chamber energy to kinetic energy in the exhaust. The relationship between chamber energy and specific impulse is

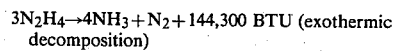

where H is that portion of the energy (enthalpy) which is converted to kinetic energy.

In a catalytic hydrazine thruster, the decomposition of anhydrous hydrazine into hydrogen and nitrogen is assumed to occur in two stages, viz., an initial decomposition and final dissociation, as follows:

$3N_2H_4 \rightarrow 4NH_3 + N_2 + 144,300$ BTU (exothermic decomposition)

and

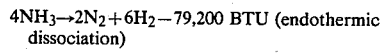

The result of these reactions produces a mixture of $N_2$, $H_2$, and $NH_3$ at a temperature of about 1600°-1800° F. Isentropic expansion of these decomposition products through a nozzle results in a theoretical specific impulse of 210 to 260 seconds. However, when various performance loss mechanisms (such as heat losses, incomplete expansion, nozzle divergence and so forth) are considered, the delivered steady state specific impulse of current hydrazine thrusters is usually in the range of 215 to 235 seconds. Consequently, the potential for performance improvement of catalytic hydrazine thrusters is very limited since the chamber enthalpy (and theoretical impulse) is limited by the net chemical energy released by the decomposition of the propellant.

Hence, there is required an increase in thruster capability to at least 300 Isp while still maintaining a sensibly constant delivered power with no significant weight increase of either thruster or propellant.

THE INVENTION

According to the invention, there is provided a process and an electrothermal thruster therefor comprising in combination: an injector tube; a heated chamber; a screen pack assembly (which includes a catalyst bed) positioned within the chamber; a superheater; a heat source for the superheater; and an expulsion nozzle.

The heater chamber may be adapted for thermal, catalytic and semi-active catalytic modes of operation. In the thermal mode, the heater may comprise an electrically actuated coil helically disposed around the outside of the chamber, a radioisotope source, etc. When operating in a catalyst mode, screen pack temperatures of 200° C.–450° C. are required; beyond 450° C., the thruster may be operated in a thermal decomposition mode. This requires greater power but improves thruster lifetime and specific impulse.

The screen pack (or catalyst bed) provides a uniform decomposition. Typical screen packs are made of platinum wire. Using hydrazine at 0.32 N at 1.724 MN/M$^2$ feed pressure, 60 screens of 0.5 centimeter diameter, 52 mesh and 0.1 mm wire diameter are adequate. Alternatively, a composite screen may be substituted. A retaining screen of 40 mesh, 0.28 mm wire diameter may be employed.

The superheater continuously and steadily imparts energy to gases emitted from the heater chamber to provide a sensibly constant power output with no discontinuity or irregularities. The superheater increases the temperature of the chamber gases. In the case of a vortex superheater, the tangential propellant injection provides a sharp radial temperature gradient resulting in a relatively cool layer of gas adjacent to the cavity walls. Conventional insulation can, therefore, be employed if desired.

Typical propellants which may be employed by the thruster include: anhydrous hydrazine, ammonia, water, hydrazine azide, monomethyl hydrazine, unsymmetrical dimethyl hydrazine, mixtures thereof, etc.; however, hydrazine is the preferred fuel.

The overall net effect produces an expulsion temperature of propellant through the nozzle which closely approaches the vortex heater element and increases the thrust capabilities from 200–235 Isp to about 300–340 Isp with an increase in thruster weight of about only a few ounces. This is equivalent to about a 20%–25% decrease in propellant requirements. As an example, for a 2000 pound spacecraft payload, normally requiring 500 pounds of propellant, the thruster of this invention can reduce this propellant requirement to about 375–415 pounds.

The invention will be more readily understood by reference to the drawings in which.

Figure 1:
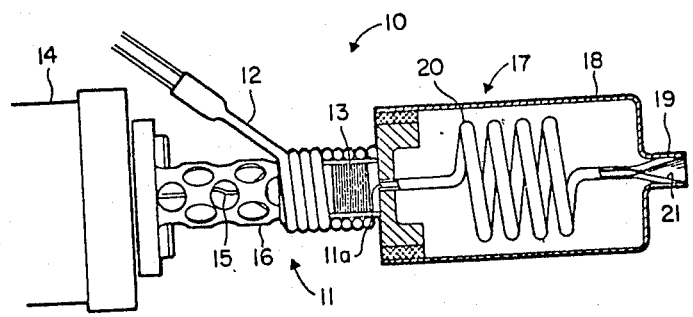
FIG. 1 is a view in axial section, partially cutaway, of one embodiment of a thruster according to this invention.
Figure 2:
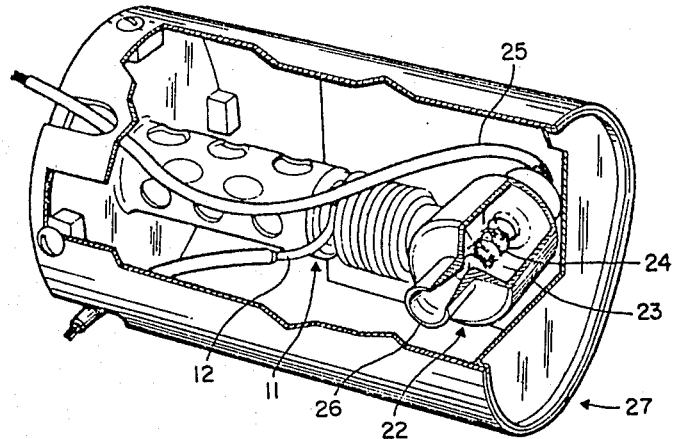
FIG. 2 is a partially cutaway perspective view showing another embodiment of the invention.

In the drawings, FIGS. 1 and 2 show the thruster 10 providing a cylindrical heater chamber 11. Heat is supplied to the heater chamber and nozzle by a helical electrical element 12 brazed to the outside of the heater chamber. A platinum screen pack 13 is positioned within the heater chamber and is adapted to absorb heat from the electrical element and burn a fuel such as hydrazine upon contact with the screen when the hydrazine flows through the chamber. Fuel is supplied from a valve 14 to the heater chamber through an injector tube 15 passing through and in contact with a perforated thermal barrier tube 16. If desired, the valve 14 may be heated with suitable means, not shown.

In FIG. 1, one embodiment of a superheater section 17 is provided for the heater chamber 11 and comprises an elongate cylindrical chamber 18 axially aligned with and abutting the heater chamber. The cylindrical chamber 18 terminates in an annulus 19. A hollow, electrically heated, coiled rhenium tube 20 is disposed centrally along chamber 18 and receives decomposed gases from the heater chamber 11 at its outlet 11a; the tube 20 terminates in a nozzle 21 which fits into the chamber annulus 19.

FIG. 2 shows a heater chamber similar to FIG. 1. However, the second embodiment of the superheater 22 of FIG. 2 is disposed at 90° to the heater chamber instead of being in axial alignment as in FIG. 1. The superheater 22 comprises a cylindrical chamber wall 23 disposed at a 90° angle to the longitudinal axis of heater chamber 11. A coiled heater 24 is disposed along the chamber axis and is heated from an electrical source 25. If desired, decomposition and/or superheating can be provided by an arc plasma or by electric discharge. A nozzle 26 is provided at the outlet of the superheater, and may be formed as an individual component or as an integral part of the chamber wall 23. If desired, the entire thruster and superheater can be housed in a metal casing 27. Decomposed propellant gases from the heater chamber are fed tangentially into the superheater section and heated further to provide additional thrust capability.

Figure 3:
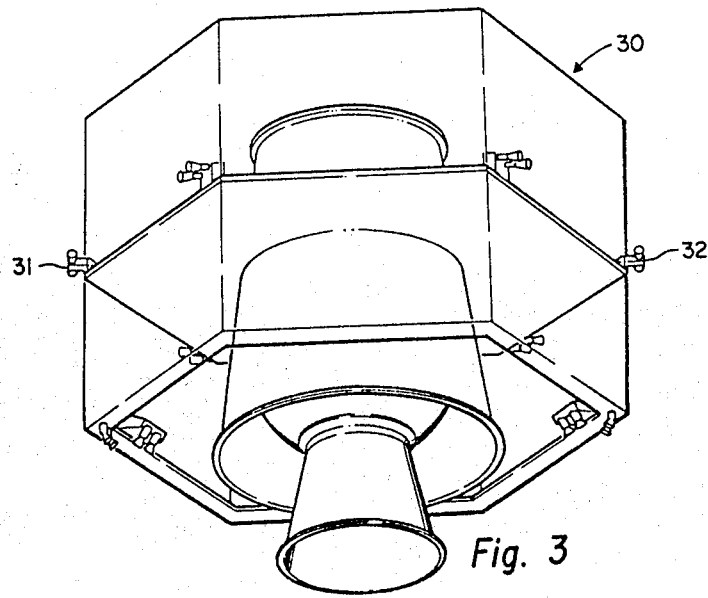
FIG. 3 is a perspective view of a satellite body showing an arrangement employing dual sets of thrusters for North-South maneuvering.

FIG. 3 illustrates a spacecraft 30 employing thrusters for various positioning maneuvers. In the particular embodiment shown, dual thrusters 31, 32 according to this invention are mounted at opposite sides of the spacecraft for North-South maneuvering.

Typically, a minimum chamber temperature of about 800° F. is required for thruster operation. The warmup time is less than 10 minutes with a heater input of 5–8 watts. The propellant valve is opened by ground command. With no heat exchanger power, the thruster temperature equilibrates in about 25 seconds and the specific impulse will be 200–205 seconds. The heat exchanger power can either be activated by ground command or switched on simultaneously with the control valve. The thermal response of the vortex superheater with full flow is a flow seconds with a corresponding specific impulse transient. The thermal response of the superheater is slightly longer. With either configuration, the commands may be interlocked to prevent the application of heat exchanger power with no propellant flow.

Preferred temperature levels at the outlet of the heater chamber vary from about 1500° F. to 2000° F., and preferred nozzle temperatures of the superheater exceed about 2500° F. A preferred nozzle temperature range varies from about 2500° F. to 5000° F. and beyond, the upper temperature being restricted only by the selected materials of construction.

Figure 4:
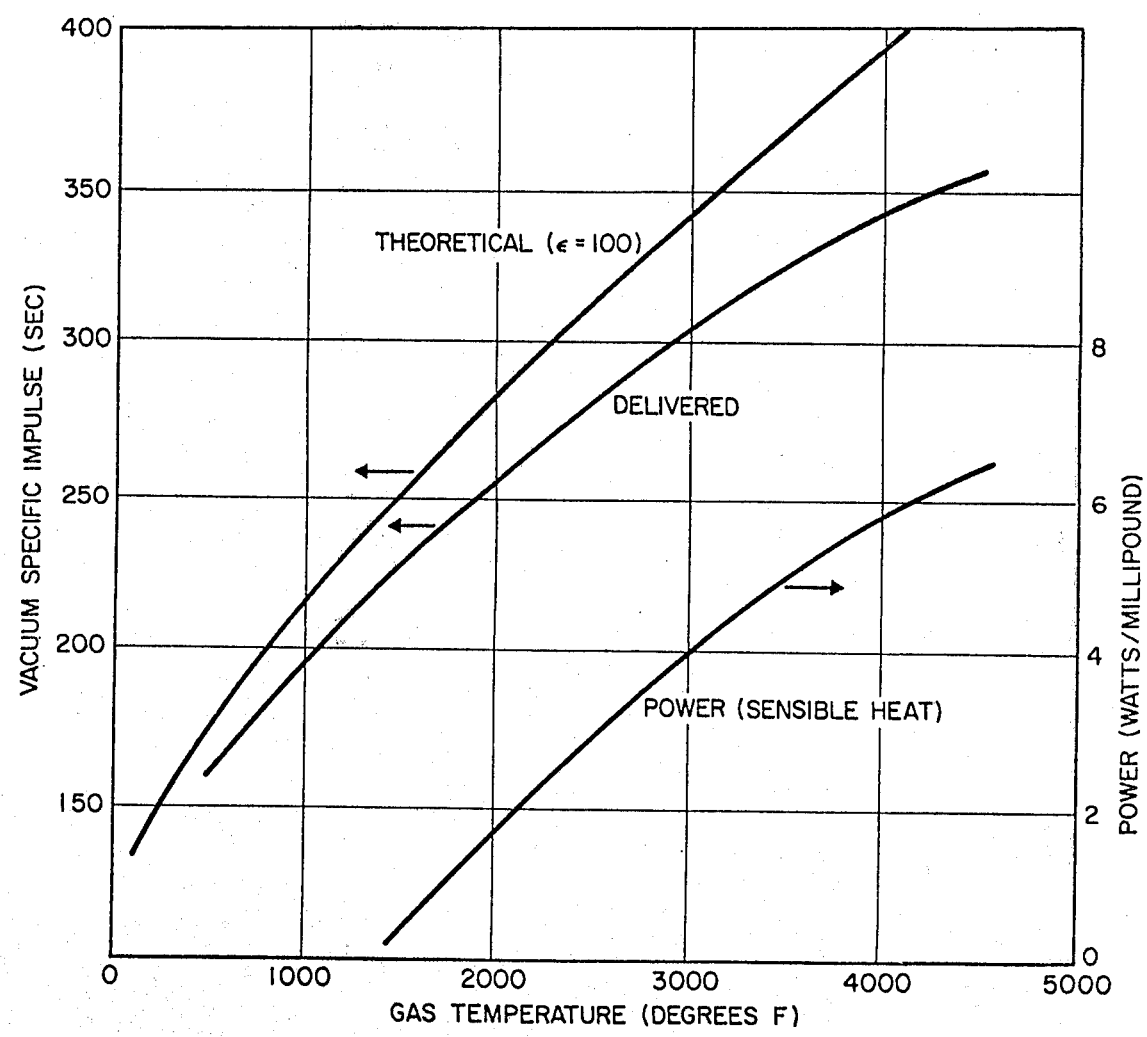
FIG. 4 is a graph showing the variation between specific impulse, gas temperature and heater power at the nozzle outlet.

The graph of FIG. 4 shows the very close correspondence of delivered specific impulse to that theoretically available from hydrazine. Furthermore, it will be observed from the graph that the delivered power is sensibly constant, with no irregularities at any point. Finally, the heater power required to operate the thruster is quite low.

Not only does the thruster of the present invention provide a 300–340 seconds specific impulse, which is suitable for North-South stationkeeping on a 2000 pound payload satellite, but it does so with a weight saving of about 85–125 pounds of propellant compared to that necessary to produce a 215–235 specific impulse (seconds) using present technology devices. Since the heater and superheater weigh only a few ounces, the extra hardware weight is negligible. This propellant weight swing advantage is enormous in present day spacecraft.

We claim:

1. A process for producing thrust comprising the steps of:
   (a) supplying a monopropellant liquid to a decomposition chamber,
   (b) decomposing said liquid within said chamber into gaseous decomposition products at decomposition temperature,
   (c) injecting the hot gaseous decomposition products from said decomposition chamber tangentially into a superheater chamber containing a heater on the chamber axis in radially spaced relation to the chamber wall and a nozzle on said axis at the other chamber end in a manner such that the gaseous decomposition products undergo vortical flow through said superheater chamber about and along said heater between the heater and said chamber wall and then exit from the latter chamber thru said nozzle to product thrust, whereby said decomposition products intercept and absorb heat radiating from said heater to said chamber wall during a prolonged residence time in said superheater chamber, and
   (d) operating said heater at a temperature such that said decomposition products exit thru said nozzle at a temperature substantially exceeding said decomposition temperature.

2. The process of claim 1 wherein:
   (a) said monopropellant liquid is a liquid hydrazine propellant whose decomposition within said decomposition chamber yields gaseous decomposition products at an initial decomposition temperature of about 1800° F.–2000° F., and
   (b) said gaseous decomposition products are heated in said superheater chamber to an exit temperature of about 2500° F. to 5000° F.

3. A process for generating thrust by means of a thruster having a specific impulse of at least 300 seconds, comprising the steps of
   (a) supplying a decomposable liquid propellant to a decomposition chamber in the thruster and heating the propellant within said chamber to decompose the propellant into gaseous decomposition products at a temperature of about 1500° F. to about 2000° F., and
   (b) injecting the decomposition products from the decomposition chamber into a superheater chamber including an elongated heating element disposed along the longitudinal axis of the superheater chamber and an expulsion nozzle on said axis through which superheated gases exit to produce thrust, said decomposition products from the decomposition chamber being injected tangentially into the superheater chamber to flow vortically about and along the heating element and out the nozzle, said gases being retained in the superheater chamber for a sufficient residence time to heat the decomposition products to a nozzle temperature exceeding 2500° F.

4. The process of claim 3 wherein:
   the liquid propellant is hydrazine.

5. An electrothermal thruster ccomprising:
   (a) a decomposition chamber having an inlet for receiving a decomposable monopropellant liquid,
   (b) means within said chamber for decomposing said liquid into gaseous decomposition products at an initial decomposition temperature,
   (c) a superheater chamber having a nozzle at one end on the axis of said chamber and a wall about said axis,
   (d) a heater within said superheater chamber situated on said chamber axis in radially spaced relation to said chamber wall,
   (e) means for conducting hot gaseous decomposition products from said decomposition chamber to said superheater chamber and injecting said hot decomposition products tangentially into said superheater chamber in a manner such that the entering hot gaseous decomposition products undergo vortical flow through said superheater chamber about and along said heater between the heater and said chamber wall and then exit from the latter chamber thru said nozzle to produce thrust, whereby said decomposition products intercept and absorb heat radiating from said heater to said chamber wall during a prolonged residence time in said superheater chamber, and
   (f) said heater being operable at a temperature such that said decomposition products exit thru said nozzle at a temperature substantially exceeding said decomposition temperature.

6. A thruster according to claim 5 wherein:
   (a) said monopropellant liquid is a liquid hydrazine propellant,
   (b) said decomposition means in said heater chamber comprises means for decomposing said hydrazine propellant into gaseous decomposition products at an initial decomposition temperature of about 1800° F.–2000° F.,
   (c) said heater comprises an electrical heater for heating said gaseous decomposition products to an exit temperature of about 2500° F.–5000° F., and
   (d) said thruster has a specific impulse on the order of 300 seconds.

7. A thruster having a specific impulse of at least 300 seconds, comprising:
   (a) a decomposition chamber, including an inlet and outlet and means for heating liquid propellant within said chamber to decompose the propellant into gaseous decomposition products at a temperature in the range of about 1500° F. to about 2000° F.,
   (b) means coupled to the inlet of the decomposition chamber for feeding liquid propellant into the decomposition chamber, said feeder means including valve means for controlling the flow of said liquid propellant,
   (c) means providing a thermal barrier between the valve means and the decomposition chamber, and
   (d) a superheater chamber including an elongate heating element disposed along the longitudinal axis of the superheater chamber and an expulsion nozzle on said axis, said superheater chamber being in communication with the outlet of the decomposition chamber so that the decomposition products from the decomposition chamber enter the superheater chamber with a tangential velocity and undergo vortical flow about the heating element so as to intercept the heat radiating outwardly from said heating element, and said vortical flow being effective to retain said decomposition products in said superheater chamber for a residence time sufficient to heat said products to an exit temperature at said nozzle exceeding 2500° F.

* * * * *